Feb. 5, 1963   E. SINGER   3,076,475
PRESSURE REGULATING VALVES UTILIZING A BAR SPRING
Filed Oct. 6, 1958   5 Sheets-Sheet 1
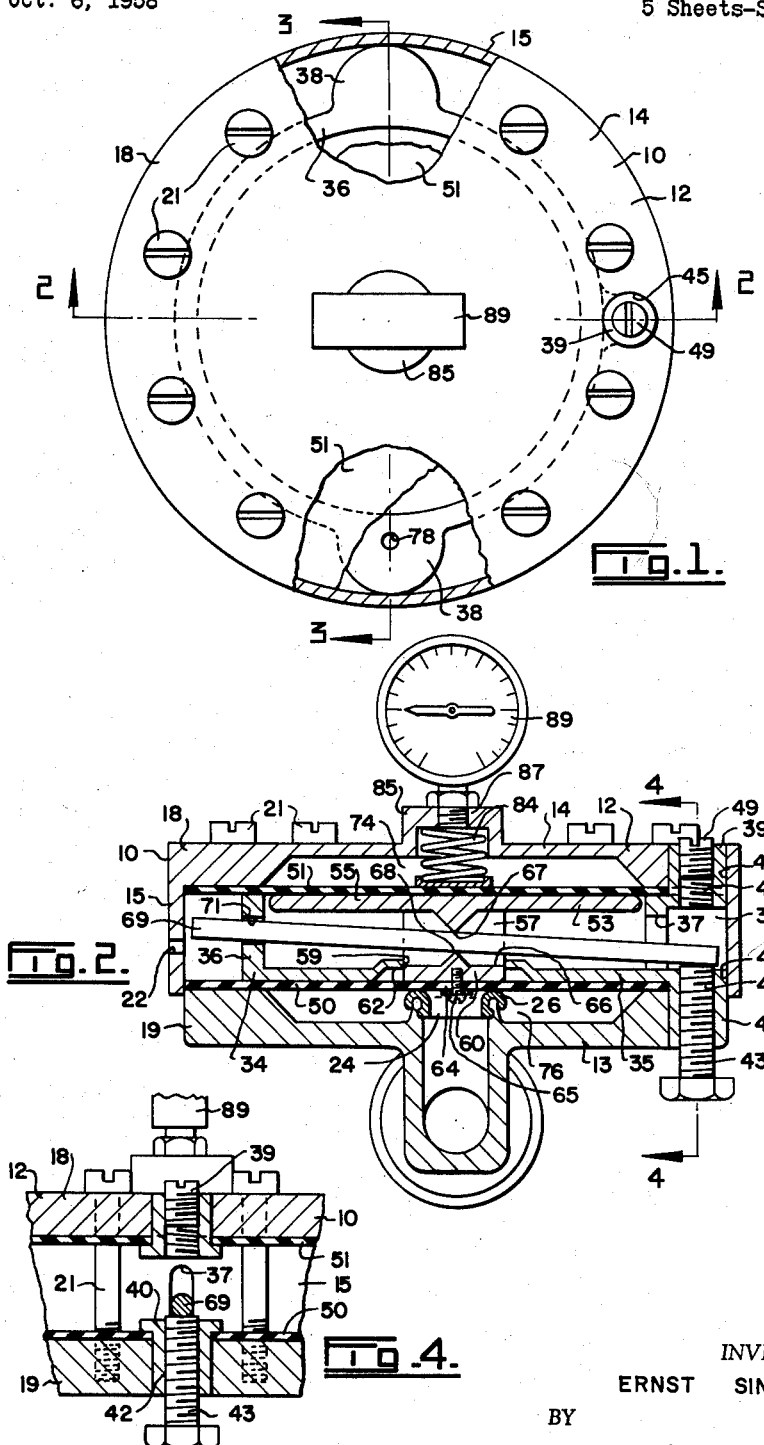
INVENTOR.
ERNST SINGER
BY
Fetherstonhaugh & Co.
ATTORNEYS Feb. 5, 1963   E. SINGER   3,076,475
PRESSURE REGULATING VALVES UTILIZING A BAR SPRING
Filed Oct. 6, 1958   5 Sheets-Sheet 2

INVENTOR.
ERNST SINGER
BY
*Fetherstonhaugh & Co.*
ATTORNEYS

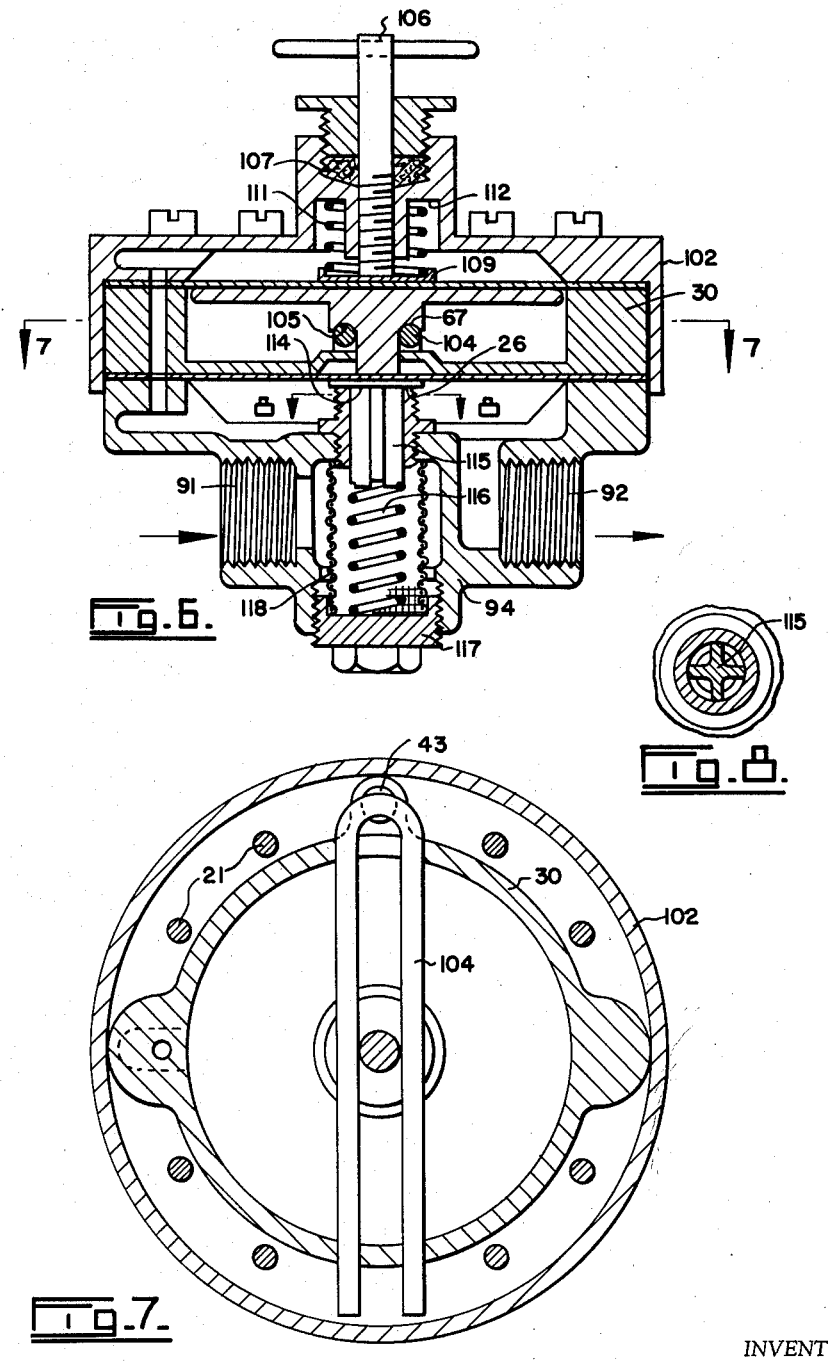

Feb. 5, 1963     E. SINGER     3,076,475
PRESSURE REGULATING VALVES UTILIZING A BAR SPRING
Filed Oct. 6, 1958     5 Sheets-Sheet 4

INVENTOR.
ERNST SINGER
BY
Fetherstonhaugh & Co.
ATTORNEYS

Feb. 5, 1963 E. SINGER 3,076,475
PRESSURE REGULATING VALVES UTILIZING A BAR SPRING
Filed Oct. 6, 1958 5 Sheets-Sheet 5

INVENTOR.
ERNST SINGER
BY
Featherstonhaugh & Co.
ATTORNEYS

United States Patent Office 3,076,475
Patented Feb. 5, 1963

3,076,475
PRESSURE REGULATING VALVES UTILIZING A BAR SPRING
Ernst Singer, 3491 Puget Drive, Vancouver, British Columbia, Canada
Filed Oct. 6, 1958, Ser. No. 765,554
2 Claims. (Cl. 137—505.21)

This invention relates to pressure regulating valves of very simple construction which may be easily and economically manufactured.

An object of the present invention is the provision of a pressure reducing and regulating valve which by means of a simple re-arrangement of its parts, may be used as a pressure relief valve, or vice versa.

Another object is the provision of a pressure regulating valve with a special spring arrangement that is adjusted by a screw and has a predetermined spring range, and which is such that it cannot be adjusted beyond its maximum range or rendered ineffective no matter how much pressure the screw exerts against the spring means.

Another object is the provision of pressure regulating valves employing one or more spring bars thereby making it possible to make the valves much smaller then conventional valves for the same purposes.

Another object is the provision of a pressure controller having an insert which may be placed therein one way to cause it to act as a pressure regulating valve, and another way to cause it to act as a pressure relief valve, but which may be constructed to function only for either purpose.

A further object is the provision of a pressure regulating valve having flexible diaphragms therein which are such that they may be turned over and/or interchanged to compensate for wear in certain parts thereof.

A further object is the provision of valves of the nature described that may be remotely controlled.

The term "spring bar" as used throughout this specification and the accompanying claims is intended to include bars or rods of any cross sectional shape, including flat and wide strips similar to leaf springs.

Figure 3:
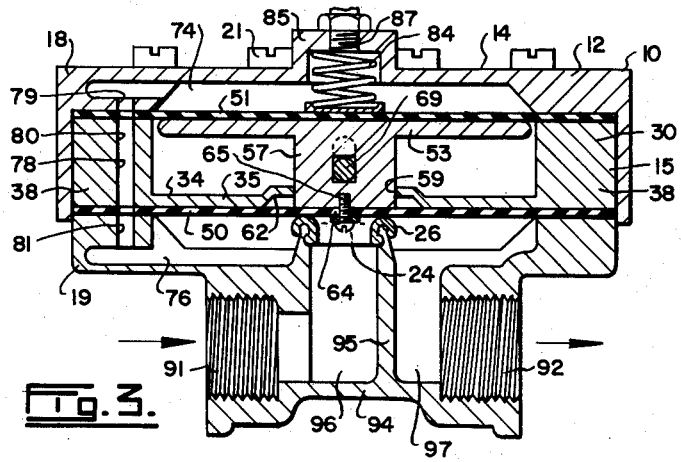
Figure 5:
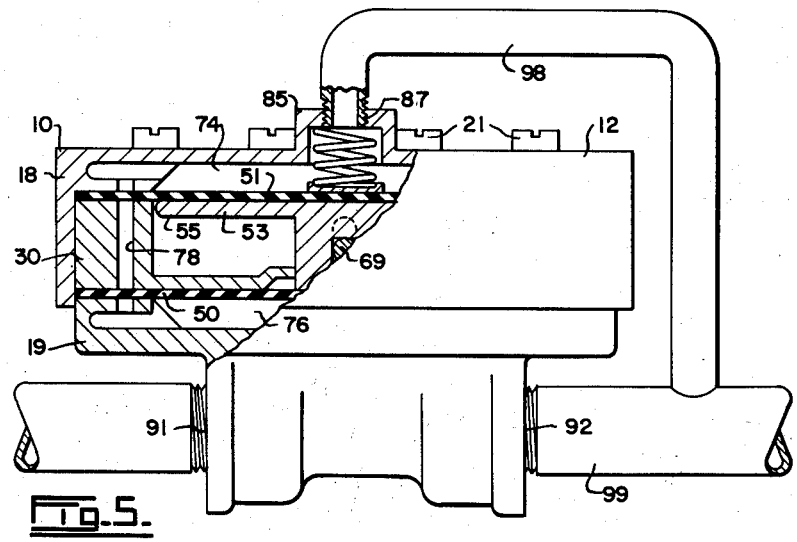
Figure 9:
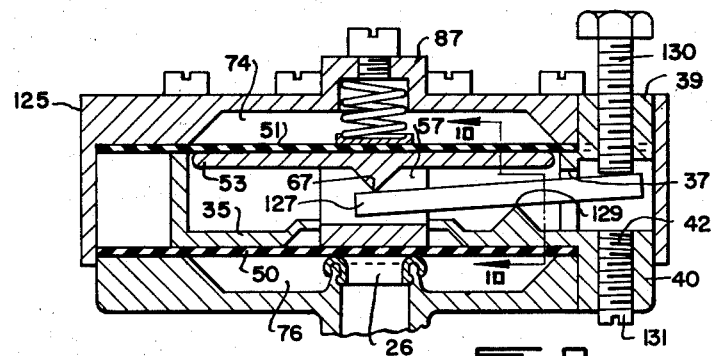
Figure 10:
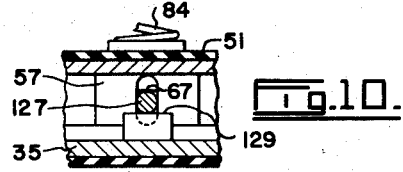
Figure 11:
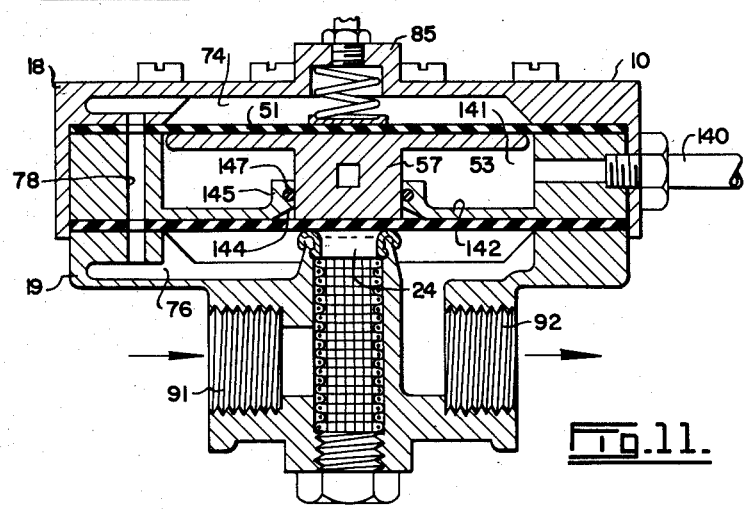
Figure 12:
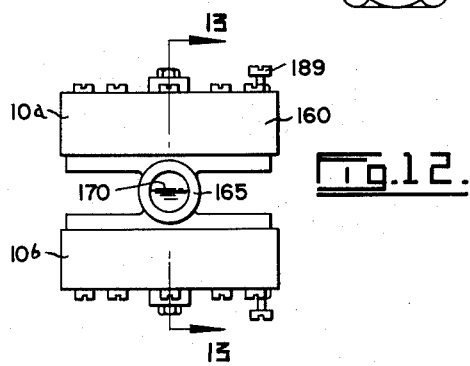
Figure 13:
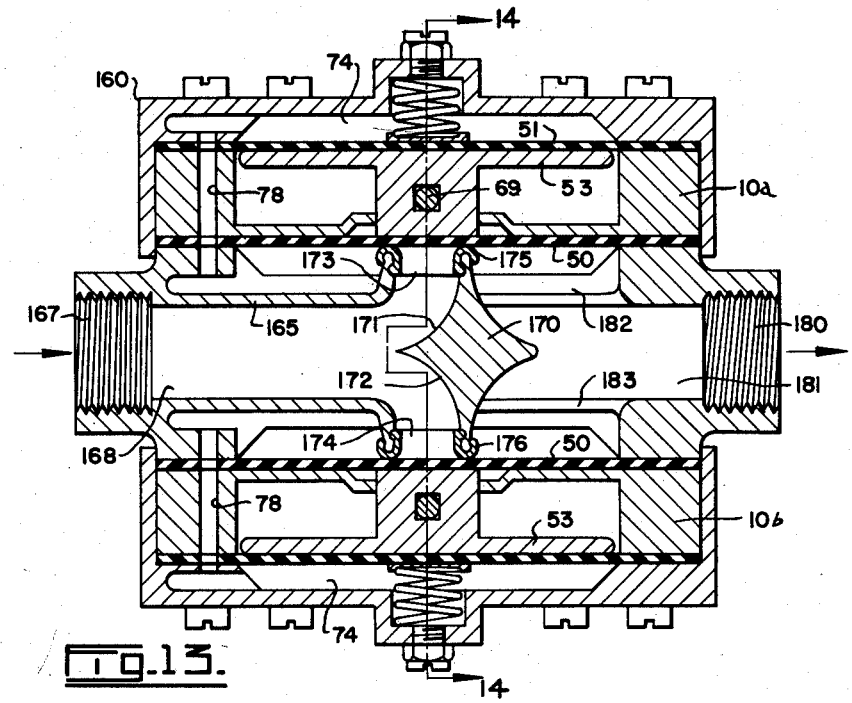
Figure 14:
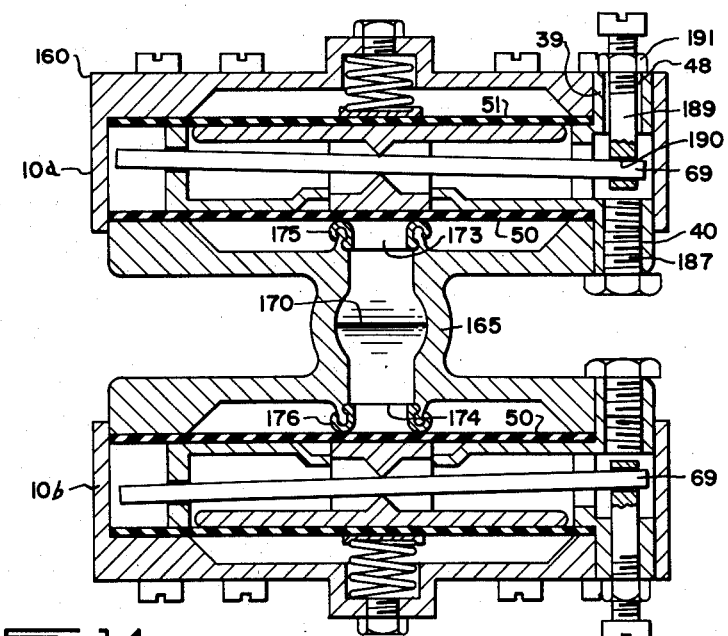

Examples of this invention are illustrated in the accompanying drawings, in which, FIGURE 1 is a plan view of one form of pressure regulating valve with parts of the casing broken away, FIGURE 2 is a sectional view taken on the line 2—2 of FIGURE 1, FIGURE 3 is a section taken on the line 3—3 of FIGURE 1, FIGURE 4 is a fragmentary section taken on the line 4—4 of FIGURE 2, FIGURE 5 is a side elevation, partly in section, of an alternative form of pressure regulating valve, FIGURE 6 is a view similar to FIGURE 3 illustrating another alternative form of pressure regulating valve which is quite similar to that of FIGURES 1 to 4, FIGURE 7 is a horizontal section taken on the line 7—7 of FIGURE 6, FIGURE 8 is a cross section taken on the line 8—8 of FIGURE 6, FIGURE 9 is a view similar to FIGURE 2 of still another alternative form of pressure regulating valve, FIGURE 10 is a fragmentary section taken on the line 10—10 of FIGURE 9, FIGURE 11 is a view similar to FIGURE 3, illustrating a variation of the valve of the latter figure, FIGURE 12 is a reduced end elevation of a dual range pressure regulator embodying substantially the valve of FIGURES 1 to 4, FIGURE 13 is an enlarged vertical view taken on the line 13—13 of FIGURE 12, and FIGURE 14 is a section taken on the line 14—14 of FIGURE 13, illustrating an alternative form of pressure adjusting means on the spring bar which may be used in any form of the regulator.

FIGURES 1 to 4 of the drawings illustrate one form of pressure regulating valve 10. This valve includes a casing 12 having opposed main walls 13 and 14, and a peripheral wall generally designated by the numeral 15 extending therebetween. It has been found desirable to make this casing in the form of a cap 18 removably secured to a base 19 in any suitable manner, such as by bolts 21, which extend through one of these units and are threaded into the other. Peripheral wall 15 forms part of cap 18 and overlaps base 19. If desired, one or more holes 22 may be formed in the cap wall or skirt 15 since the interior of the controller is maintained at atmospheric pressure. An opening 24 is formed in wall 13 centrally thereof, and an annular seat 26 is secured to this wall surrounding said opening and extending into the casing.

A flexible diaphragm extends across seat 26 and has a pusher bearing against the side thereof remote from said seat. Various forms of pressure means are incorporated into the valve for adjustably and yieldably moving or permitting the diaphragm to be moved away from said seat.

An insert or unit 30 is located in casing 12 and extends across the interior thereof between cap 18 and base 19. Although this insert may be secured in position in any desired manner, it is perferable to construct it and the casing parts so that the insert is pressed between said casing parts and held together by bolts 21, as shown. This insert comprises a cup-shaped member 34 having a main wall 35 with a peripheral wall 36 projecting outwardly therefrom, said peripheral wall having a vertical slot 37 therethrough extending away from wall 35. Peripheral wall 35 has a plurality of protuberances 38 on its outer surface that extend out to peripheral wall 15 of the cap, see FIGURE 1, to position insert or unit 30 centrally of the casing. With this construction, wall 36 is spaced inwardly of and concentric with wall 15. A plug 39 is connected to the peripheral wall 36 at slot 37 and extends in a direction away from wall 35, and another plug 40 is aligned with plug 39 and connected to wall 36 at the opposite end of the slot, the latter plug extending away from the former plug, see FIGURE 2. Plug 40 is tapped at 42 to receive an adjusting screw 43. Plug 39 fits in and closes a hole 45 through cap 18 while plug 40 extends down into a hole 47 in base 19. Plug 39 may be solid but it is preferable to tap it as indicated at 48, in which case a screw 49 may be fitted in the tap to keep dirt out of the interior of the casing.

Flexible diaphragms 50 and 51 extend across opposite faces of insert or unit 30 and are secured in place in any desired manner. In this example, the diaphragms are secured in place against the insert when the cap and base are secured together by screws 21. With this arrangement, when the screws are taken out, all of the elements of the valve come apart. The diaphragm 51 extends across the edge of peripheral wall 36 remote from the main wall 35, and a pusher 53 is located inside the diaphragm. Pusher 53 is formed with an enlarged head 55 bearing against the inner surface of diaphragm 51 and freely fitting within the peripheral wall 36 of the insert, as clearly shown in FIGURES 2 and 3. The pusher also includes a guide 57 extending from head 55 inwardly and slidably through an opening 59 formed in insert wall 35 centrally thereof, said guide terminating in a relatively small head 60. A small recess or depression 62 is formed in wall 35 and opens outwardly therefrom at and around opening 59 so that pusher head 60 extends into this recess and bears against the central portion 64 of diaphragm 50 which extends across recess 62. It will be noted that wall 35 backs up most of diaphragm 50 so that only the central portion 64 of the latter over recess 62 is free to flex. In some instances it is desirable to secure the central portion 64 of the diaphragm to head 60 in some suitable manner, such as by a screw 65.

Regulator 10 includes adjustable pressure means in the form of a spring bar. Consequently, pusher guide 57 is formed with a vertical slot 66 extending therethrough. A first pivot or fulcrum point or ridge 67 is formed on the pusher 55 within slot 66 at one end thereof, see FIGURE 2. If desired, another pivot point or ridge 68 may be provided at the opposite end of the slot spaced from and opposed to ridge 67. A spring bar 69 extends through peripheral wall slot 37 and pusher slot 66, and bears against fulcrum 67. This bar may also bear against ridge 68, if said ridge is provided in the pusher arrangement. Suitable means is provided in the insert for retaining this bar against the pivot ridge or ridges. In this example, a hole 71 is formed in peripheral wall 36 of the insert on the opposite side of the latter from slot 37. This hole is of such size that the spring bar extends freely therethrough, although it preferably is little larger than said bar. Adjusting screw 43 bears against the opposite end of the spring bar and presses said bar against ridge or fulcrum 67. At this time, the portion of wall 36 around hole 71 acts as a second fulcrum point spaced laterally from and opposed to fulcrum 67.

Pressure regulating valve 10 is formed with an outer chamber 74 in cap 18 across which diaphragm 51 extends. A base or inner chamber 76 is formed in or above base 19, and diaphragm 50 extends across the latter chamber. Chambers 74 and 76 are in communication through at least one passage 78 formed in aligned sections 79, 80 and 81 in the cap, insert peripheral wall and base, respectively, see FIGURE 3.

A damper spring 84 may be provided between cap 18 and diaphragm 51 of unit 30. For this purpose, a hollow boss 85 is provided on the wall 14 of cap 18 centrally thereof, said boss opening into chamber 74 so that the upper end of spring 84 fits within this boss. In addition to this, an internally-threaded hole 87 is formed in boss 85 and opens into the interior thereof for receiving a gauge 89. If the gauge is not required, hole 87 may be closed by a plug.

Ports 91 and 92 are provided for casing 12. These ports are formed in a port section 94 which is secured to and projects downwardly from casing wall 13. One port communicates directly with the interior of the casing, while the other port communicates therewith through opening 24 and annular seat 26. A wall 95 in port section 94 completely separates ports 91 and 92, and divides said port section into chambers 96 and 97 into which ports 91 and 92 are respectively open. In this example, 91 is an inlet port and 92 an outlet port. The inlet port communicates with the interior of casing 12 through seat 26, while port 92 communicates directly therewith at base chamber 76. Actually, the latter port communicates with casing chamber 74 through chamber 76 and passage 78.

The pressure regulating valve 10 of FIGURES 1 to 4 operates in the following manner. The outlet pressure of the valve is regulated by turning screw 43 to increase or decrease the pressure of spring bar 69 against fulcrum point 67. The outlet pressure in chamber 97 at port 92 is applied to diaphragm 51 through chamber 76, passage 78, and chamber 74. When fluid is passing through the valve, inlet pressure against the central portion 64 of diaphragm 50 tends to keep said diaphragm off seat ring 26. When the outlet pressure reaches the level at which the valve is set, it is sufficient to move pusher 53 downwardly to press head 60 thereof against diaphragm 50, thereby pressing said diaphragm against seat 26 to close the valve. This takes place against the action of spring bar 69, and this is possible because the area of diaphragm 51 subjected to the outlet pressure is much greater than the central area 64 of diaphragm 50 under the influence of said pressure. Most of the latter diaphragm is backed by the stationary wall 35 of the insert so that only the portion of said diaphragm over recess 62 is influenced by the pressure of the fluid in the valve.

One of the features of the spring arrangement of this valve is that no matter how much pressure is exerted against the spring bar by screw 43, said bar merely moves against the end of slot 37 so that it still functions satisfactorily at its maximum setting. Furthermore, it is obvious from FIGURES 2 and 3 that since the spring bar extends substantially parallel with the diaphragms 50 and 51, it requires very little space between said diaphrams. This makes it possible to make the valves considerably smaller than the valves of the prior art which utilize coil springs for adjusting the regulated pressure of valves of this type. Furthermore, if these coil springs are pressed too tightly, they become practically solids making the valves inoperative.

Other advantages of this valve result from the fact that when screws 21 are removed, the entire valve comes apart; diaphragms 50 and 51 are identical and, therefore, may be turned over and/or interchanged to compensate for wear, particularly wear at seat ring 26; and all of the metal parts of the valve may be cast, and the only additional work necessary is to thread the various openings where required.

FIGURE 5 illustrates a slight variation in the pressure regulating valve 10 of FIGURES 1 to 4. Gauge 89 has been removed, and a pipe 98 extends from hole 87 in boss 85 to a pipe 99 extending from outlet port 92. It will be noted that either or both of diaphragms 50 and 51 of unit 30 is or are turned over so that fluid cannot flow through passage 78. Both diaphragms have been turned over in FIGURE 5. As a result of this, there is no communication between chambers 74 and 76 within the valve.

With this arrangement, the outlet pressure in pipe 99 at pipe 98 is applied to diaphragm 51 in chamber 74 of the valve. Otherwise, the valve functions exactly as described above. The only difference is that the valve of FIGURES 1 to 4 operate in accordance with the pressure at outlet port 92, whereas the valve of FIGURE 5 operates in accordance with the pressure in pipe 98. This makes it possible to have the valve function according to an outlet pressure remote therefrom as is common with valves of this type. Pipe 98 may connect to pipe 99 at any point remote from the valve.

The pressure regulator 102 of FIGURES 6 to 8 is very similar to that of FIGURES 1 to 4, but it incorporates two variations from the previously described valve. The insert 30 of this valve has, instead of a single spring bar 69, a U-shaped spring bar 104 which functions in the same manner as the single rod. This U-shaped rod may be used in any of the other valves as well. If desired, the spring may extend through grooves 105 in the fulcrum point or ridge 67, said grooves helping to keep the spring in its proper place.

Valve 102 is designed so that it may be shut off at will. For this purpose, it has a shut-off stem 106 threaded in the valve and extending through a packing gland 107. This stem bears against a plate 109 at its lower end pressing against the valve insert or unit so that the latter may be moved downwardly against seat ring 26 to close the valve. A damper spring 111 extends between plate 109 and a shoulder 112 of the packing gland. Furthermore, if this valve is to be used for steam, it is desirable to provide a metal plate 114 movably mounted in valve seat 26. A guide 115 is secured to plate 114 and extends downwardly therefrom and slidably extends through opening 24. This plate is urged towards the undersurface of the valve insert 30 by a spring 116 that bears against the lower end of guide 115 and rests on a plug 117 screwed in to the bottom of the port section 94. If desired, a tubular screen 118 may be located in the port section extending from the top to the bottom thereof, and through which passes all the fluid entering the valve through port 91. Plate 114 with its associated elements, and screen 118 may be used in any of the regulating valves.

Presure regulator 102 of FIGURES 6 to 8 has been included to show that this pressure regulating valve may include means for shutting off the flow of liquid therethrough at will. It further illustrates an alternative form of spring bar, and shows that any of these valves may include a cylindrical screen to protect the valve against impurities in the fluid passing therethrough.

FIGURES 9 and 10 illustrate a pressure regulating valve 125 which is the same as valve 10 of FIGURES 1 to 4, excepting that a different spring bar arrangement is used. A short spring bar 127 is used in place of bar 69. One end of bar 127 bears against the fulcrum point or ridge 67 of pusher 53, and said bar extends over a second fulcrum point or ridge 129 formed on insert wall 35 between guide 57 and slot 37 of insert 30. Fulcrum 129 is spaced laterally from and opposed to fulcrum 67. As it is necessary to press down on the outer end of bar 127 in order to apply tension thereto, screw 48 is removed and a screw 130 is threaded in plug 39 and turned to bear against the adjacent end of the bar. A screw 131 is threaded into tap 42 of plug 40 to close said tap.

Pressure controller 125 of FIGURES 9 and 10 functions in the same manner as pressure controller 10. The outlet pressure of the valve is adjusted by turning screw 130 to increase or decrease the tension of spring bar 127 thereby increasing or decreasing the pressure against ridge 67 of the pusher.

If desired, valve 125 may be provided with a U-shaped spring bar in place of bar 127. This U-shaped bar would be similar to but shorter than bar 104 of FIGURE 7.

FIGURE 11 illustrates the pressure regulating valve of FIGURES 1 to 4 with an alternative form of pressure means therein. Spring bar 69 has been omitted. In place of said bar, a pipe 140 communicates with the space 141 between pusher 53 and base or backing wall 142 that has been substituted for wall 35. Wall 142 has a recess 144 formed therein centrally thereof. A boss 145 is connected to this wall around the recess and extends inwardly towards pusher 53. A suitable seal, such as an O-ring 147, is provided between the boss and guide 57 which slidably extends through said boss into recess 144.

Pipe 140 has a pressure control valve therein (not shown), and is connected to a suitable source of gas, such as air, under pressure.

The valve of FIGURE 11 is such that it may be adjusted from a remote point, control valve of pipe 140 being located at said remote point. Changes in the air pressure change the pressure in space 141 to vary the pressure against pusher 53, thereby varying the set outlet pressure of the valve. This pressure control may be used with any of the valves described herein. Furthermore, all the valves may be constructed with the sealing arrangement around guide 57 and with a port to receive pipe 140. This will make it possible to use the air or spring bar control with any valve. If the air is not used, the port for pipe 140 is plugged off, and a suitable spring bar is inserted through the pusher head.

FIGURES 12 to 14 illustrate a dual range pressure regulator 160. This is actually two valves incorporated in a single unit, and any of the above-described pressure regulating valves may be used for this purpose. Valve 10 of FIGURES 1 to 4 has been used as an illustration.

Two valves 10a and 10b are placed opposite each other, and these have a common port section 165 in place of port section 94. Port section 165 has an inlet port 167 opening into an inlet chamber 168 which extends substantially parallel to the two valves 10. A deflector 170 is provided at the inner end of chamber 168 and has curved walls 171 and 172 which form parts of the walls of openings 173 and 174 within annular seats 175 and 176, respectively. Seat 175 is normally closed by diaphragm 50 of one valve, while seat 176 is normally closed by diaphragm 50 of the other valve.

Port section 165 is also formed with an outlet port 180 which is in communication with an outlet chamber 181 communicating with base chambers 76 of both valves through openings 182 and 183.

Dual range pressure regulator 160 is used in situations where there are periods of low and high demand for the fluid passing therethrough. For example, if this valve is used as a pressure regulating valve in an apartment house, there would be little demand for water through the night, whereas in the day time, there may be periods of great demand.

Valves 10a and 10b are usually set at slightly different pressures. For example, valve 10a may be set for an outlet pressure of 40 pounds, and valve 10b for an outlet pressure of 37 pounds. When the pressure in outlet chamber 181 and, consequently, chamber 74 of valve 10a drops below 40 pounds, diaphragm 50 is lifted off seat 175 to supply water at the set pressure. If through increased demand the pressure in chamber 181 and chamber 74 of valve 10b drops below 37 pounds, diaphragm 50 of the latter valve is lifted off seat 176 further to increase the flow through the outlet port. Thus, during periods of high demand, both valve 10a and 10b function to supply water at the pressure of the setting of valve 10b. However, during periods of little demand, only valve 10a will function.

It will be noted that passages 78 of valves 10a and 10b have been shown the same size. However, it will be understood that one passage may be smaller than the other, if so desired.

Although valves 10a and 10b of dual pressure regulator 160 may have exactly the same spring bar and pressure adjustment means as valve 10 of FIGURES 1 to 4, FIGURE 14 illustrates an alternative pressure adjustment means. The alternative adjustment means of the two valves being the same, only one, that of valve 10a, will be described herein.

Set screw 43 and screw 49 have been removed, and a screw 187 replaces the former to close tap 42 of plug 40. An adjusting screw 189 extends freely through tap 48 in plug 39. This adjusting screw has a hole 190 through its inner end, and the adjacent end of spring bar 69 extends through this hole. A nut 191 is threaded on the outer end of screw 189 and bears against the outer surface of the valve casing. The tension on spring bar 69 is adjusted by turning nut 191 to move screw 189 inwardly or outwardly of the casing. When the screw is moved outwardly, the pressure of the bar against ridge 69 of the pusher is increased and vice versa.

The spring adjusting means of FIGURE 14 may be used in any of the other pressure regulating valves.

What I claim as my invention is:

1. A pressure regulating valve comprising a casing having opposed spaced main walls and a peripheral wall extending therebetween, a removable insert mounted in the casing and comprising a main wall extending parallel to and spaced from a casing main wall and having a peripheral wall spaced from the casing peripheral wall and extending towards the other casing main wall, said insert main wall having an opening and a recess therein centrally thereof, said recess opening towards the casing main wall from which the insert main wall is spaced, a pusher freely fitting within the insert peripheral wall spaced from the insert main wall and from said other casing main wall, the spaces between the insert main wall and the pusher and the adjacent casing main walls forming respectively inner and outer chambers, head means connected to the pusher and slidably extending through said insert main wall opening into the recess thereof, parallel inner and outer flexible diaphragms lying over the insert main wall and the pusher respectively and fixed within the casing, the diaphragm over the insert main wall being backed thereby and having its central portion extending across the recess and the head means therein, an opening in the casing wall communicating with the inner chamber opposite the central portion of the inner diaphragm, an annular seat on the last mentioned casing wall formed around said opening and extending towards and terminating near the central portion of the inner diaphragm, an inlet port for the casing communicating with the inner chamber through the annular seat, an outlet port for the casing communicating with the inner chamber outside the seat, a fulcrum point on the pusher centrally thereof and extending towards the insert main wall, said peripheral wall of the insert having a hole therein, a spring bar extending between the pusher and the insert main wall and having an end extending freely into the hole in the insert peripheral wall, said spring bar freely engaging said fulcrum point and normally urging the pusher outwardly against the outer diaphragm and the head means away from the annular seat, an adjusting screw threaded through the insert main wall and engaging the spring bar near the opposite end thereof to adjust the pressure of said bar against the fulcrum point and pusher, passage means extending from the outlet port and opening into the outer chamber whereby the pressure of fluid leaving the outlet port after passing through the valve is transferred to the outer chamber, said insert peripheral wall having a slot therein opposed to the hole in the latter wall, said slot extending in a direction away from the insert main wall, the end of the spring bar which is engaged by the adjusting screw extending through said slot, said screw being located outside the insert peripheral wall, and when the fluid pressure in said outlet chamber against the outer diaphragm and the pusher is sufficient to overcome the pressure of the spring bar the head means of the pusher moves the inner diaphragm against the seat to stop the flow of fluid therethrough.

2. A pressure regulating valve comprising a casing having opposed spaced main walls and a peripheral wall extending therebetween, a removable insert mounted in the casing and comprising a main wall extending parallel to and spaced from a casing main wall and having a peripheral wall spaced from the casing peripheral wall and extending towards the other casing main wall, said insert main wall having an opening and a recess therein centrally thereof, said recess opening towards the casing main wall from which the insert main wall is spaced, a pusher freely fitting within the insert peripheral wall spaced from the insert main wall and from said other casing main wall, the spaces between the insert main wall and the pusher and the adjacent casing main walls forming respectively inner and outer chambers, head means connected to the pusher and slidably extending through said insert main wall opening into the recess thereof, parallel inner and outer flexible diaphragms lying over the insert main wall and the pusher respectively and fixed within the casing, the diaphragm over the insert main wall being backed thereby and having its central portion extending across the recess and the head means therein, an opening in the casing wall communicating with the inner chamber opposite the central portion of the inner diaphragm, an annular seat on the last mentioned casing wall formed around said opening and extending towards and terminating near the central portion of the inner diaphragm, an inlet port for the casing communicating with the inner chamber through the annular seat, an outlet port for the casing communicating with the inner chamber outside the seat, a first fulcrum point on the pusher centrally thereof and extending towards the insert main wall, a second fulcrum point on the insert main wall extending towards the pusher and spaced from the first fulcrum point, a spring bar extending between and freely engaging the first and second fulcrum points, said spring bar normally urging the pusher outwardly against the outer diaphragm and the head means away from the annular seat, an adjusting screw threaded through the casing main wall that is spaced from the pusher and engaging the spring bar near an outer end thereof extending outwardly from the second fulcrum point and away from the first fulcrum point to adjust the pressure of said bar against said first fulcrum point and pusher, passage means extending from the outlet port and opening into the outer chamber whereby the pressure of fluid leaving the outlet port after passing through the valve is transferred to the outer chamber, said insert peripheral wall having a slot therein through which said outer end of the spring bar extends, said slot extending in a direction away from the insert main wall, said adjusting screw being located outside the insert peripheral wall, and when the fluid pressure in said outlet chamber against the outer diaphragm and the pusher is sufficient to overcome the pressure of the spring bar, the head means of the pusher moves the inner diaphragm against the seat to stop the flow of fluid therethrough.

References Cited in the file of this patent
UNITED STATES PATENTS

| | | |
|---|---|---|
| 323,364 | Pfaudler | July 28, 1885 |
| 868,599 | Coleman | Oct. 15, 1907 |
| 2,161,679 | Kuenhold | June 6, 1939 |
| 2,249,010 | Kuenhold | July 15, 1941 |